June 10, 1930. V. K. ZWORYKIN 1,763,207
PHOTO ELECTRIC DEVICE
Filed Jan. 29, 1927
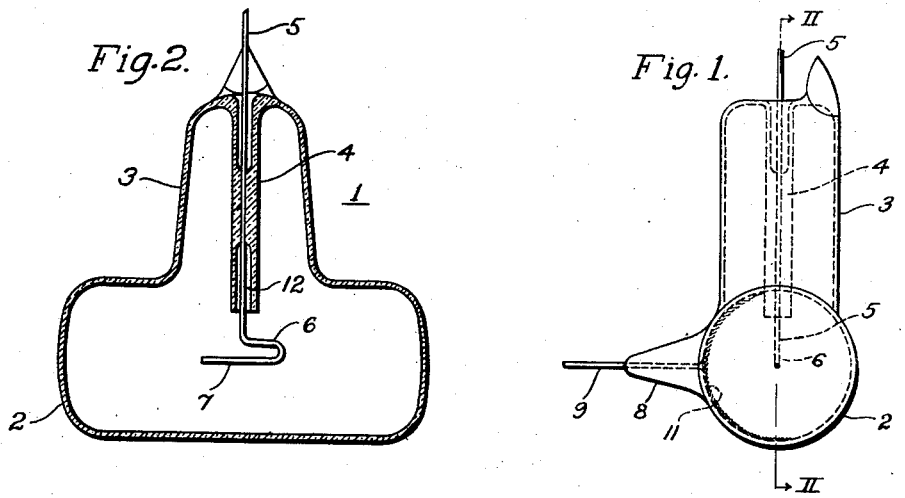
WITNESSES:
CJ. Weller.
JR Goldsborough
INVENTOR
Vladimir K. Zworykin.
BY
Wesley G. Carr
ATTORNEY Patented June 10, 1930

1,763,207

UNITED STATES PATENT OFFICE

VLADIMIR K. ZWORYKIN, OF SWISSVALE, PENNSYLVANIA, ASSIGNOR TO WESTING-HOUSE ELECTRIC & MANUFACTURING COMPANY, A CORPORATION OF PENNSYLVANIA

PHOTO-ELECTRIC DEVICE

Application filed January 29, 1927. Serial No. 164,476.

My invention relates to photo-electric devices, and it has particular reference to improvements in the physical characteristics of such devices, and to improvements in apparatus intended to support such devices in operative position with reference to a varying light source.

One object of my invention is to provide a photo-electric cell that is substantially unaffected by physical vibrations, and is consequently non-microphonic.

Another object of my invention is to provide a photo-electric cell of relatively small dimensions.

Another object of my invention is to provide in a photo-electric cell an electrode having a natural period of vibration sufficiently high that no interference is caused in the output of the cell by the physical vibration of said electrode when the cell is subjected to shock.

Another object of my invention is to provide a photo-electric cell that can be produced in large quantities with assurance that the characteristics of individual cells will be substantially similar.

Another object of my invention is to provide a mounting device for a photo-electric cell whereby such cell may be supported in intimate association with a thermionic amplifier.

Another object of my invention is to provide a combined mounting device for a thermionic amplifier and a photo-electric cell whereby the conductors therebetween may be of minimum length, and may be protected against injury.

Perhaps the most important present field of usefulness for photo-electric cells is the talking motion-picture industry. The sounds or music accompanying the scenes photographed are also photographically recorded on the film, and are reproduced later in the theatre by passing light from a fixed and unvarying source through the film onto a photo-electric cell connected to a thermionic amplifier.

Inasmuch as it is expedient to mount the photo-electric cell in the projecting machine, it is obviously subjected to a considerable amount of physical vibration when the machine is in operation. Cells of the usual type are totally unsuited for this purpose, being in general extremely "microphonic", and consequently noisy. The microphonic noises, which at first were thought to be caused by electrostatic or electromagnetic disturbance, I have determined to be caused by mechanical vibration of the photo-electric cell electrodes. Such vibration changes the inter-electrode impedance of the cell, and consequently influences the output thereof.

I have accordingly changed the physical configurement of one of the photo-electric cell electrodes, the anode, by making it extremely short and rigid. My improved anode has, of course, a natural period of vibration, but this period is purposely made so high that it is far above audition, and consequently has no effect upon the ultimate sound output of the amplifier associated with the cell.

In addition, I have so arranged the anode in the cell with reference to the cathode that the active portion of such anode is coaxial with the cathode surface. Axial vibrations therefore do not appreciably affect the electrode spacing, and such vibrations, even though at audio frequencies, will have minimum affect on the ultimate output.

The time lag of the photo-electric cell and amplifier system is greatly influenced by the length of the conductive connections therebetween, and another phase of my invention concerns a mounting device for supporting a cell and a thermionic device in intimate relation, whereby the connections are materially shortened. This result is accomplished by locating the support for the cell immediately adjacent a thermionic-device socket of the usual type.

The novel features which are considered characteristic of this invention are set forth with particularity in the appended claims. The invention itself, however, both as to its organization and method of operation, together with further objects and advantages thereof, will best be understood by reference to the following description, taken in connection with the accompanying drawings, in which—

Fig. 1 is an end elevational view of my improved photo-electric tube.

Fig. 2 is a cross-sectional view taken on a line corresponding to the line II—II of Fig. 1.

Referring specifically to Figs. 1 and 2, my improved photo-electric cell comprises a small glass container 1 having a main cylindrical portion 2 and an offset portion 3 provided with a press 4 through which passes a rigid electrode 5. The electrode 5 is reversely bent at its free end 6, a portion 7 thereof being substantially coaxial with the major cylindrical portion 2 of the glass envelope.

The envelope 1 is further provided with a second extension 8, into which is sealed a lead wire 9 that makes conductive contact with a photo-sensitive layer 11 deposited on the interior surface of the main cylindrical portion 2.

The press supporting the rigid electrode or anode is hollowed out at its free end 12 in order to provide a longer leakage path between the electrode 7 and the photo-sensitive cathode 11.

In the preferred form of my improved photo-electric tube the main cylindrical portion 2 of the envelope is approximately an inch and one-half long and three-quarters of an inch in diameter. The straight portion of the anode which is coaxial with the cylindrical portion of the container is preferably about one-quarter of an inch or less in length, and that portion of the electrode 5 between the point where it is fused into the press and the first bend is preferably about three-eighths of an inch long. The wire from which the electrode is made should be about one-sixteenth of an inch in diameter and should possess considerable stiffness. The natural period of vibration of an electrode as described is far above the range of audibility.

The photo-sensitive potassium hydride layer 11 may be deposited in the tube by any of the methods now well-known to those skilled in the art, the method of deposition forming no part of the present invention. Attention is called, however, to the fact that the protuberant portion 3 of the container which carries the anode supporting press is well adapted to provide a long leakage path between electrodes. In addition, it is very easy, during the course of manufacture of the tube, to apply heat to this protuberant portion in order that any potassium deposited thereon may be redistilled and deposited on the cylindrical portion 2 of the container.

The straight portion 7 of the anode is preferably substantially coaxial with the cylindrical portion of the container. When this relationship is maintained, vibration of the portion 7 of the anode axially of the cylinder does not appreciably affect the relative spacing of the electrodes. Although the electrode is made so stiff that its natural frequency is above audition, at the same time, there is a possibility that vibration at lower frequencies might occur and, even if such vibrations do occur, the axial location of the active portion of the electrode tends to largely minimize the objectionable effects due to changes in electrode spacing.

Although I have illustrated and described but a single specific embodiment of my improved photo-cell and photo-electric cell thermionic tube amplifier unit, many variations thereof and parts will be suggested to those skilled in the art. My invention, therefore, is not to be limited except as is necessitated by the prior art and by the spirit of the appended claims.

I claim as my invention:

1. In a photo-electric cell, an anode comprised of a metal rod and a cathode spaced from said anode, the perpendicular distance from said cathode to said anode being not over six times the diameter of said rod.

2. In a photo-electric cell, a cylindrical cathode, and an anode rod having a portion substantially parallel to the axis of said cathode, said rod having a diameter substantially one-sixth of the radius of said cathode.

3. In a photo-electric cell, a cylindrical cathode, and an anode having a relatively rigid portion substantially parallel to the axis of said cathode, and having a natural period of vibration above the range of audible sound.

4. An electrical discharge tube having a cathode adapted to emit electrons and an anode supported in rigid relation thereto, the elastic constants of the intervening support being such as to preclude mechanical vibration of said anode relative to said cathode of a periodicity within the range of audible sound.

5. A photo-electric cell comprising a cathode, an anode and a support for said anode, said anode and support together having a natural fundamental frequency of vibration which is above the range of audible sound.

In testimony whereof, I have hereunto subscribed my name this 27th day of January 1927.

VLADIMIR K. ZWORYKIN.